(12) United States Patent
Yapp et al.

(10) Patent No.: US 7,170,010 B1
(45) Date of Patent: Jan. 30, 2007

(54) PROTECTIVE COVER AND SYSTEM FOR ELECTRICAL ENCLOSURES

(75) Inventors: Brian Scott Yapp, Roswell, GA (US); Luis J. Hernandez, Memphis, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/183,476

(22) Filed: Jul. 18, 2005

(51) Int. Cl.
  *H01B 1/00* (2006.01)
(52) U.S. Cl. .......................... 174/135; 174/50; 174/66
(58) Field of Classification Search ............... 174/135, 174/50, 38, 50.51, 66, 67, 2
See application file for complete search history.

(56) References Cited

U.S. PATENT DOCUMENTS

| | | | |
|---|---|---|---|
| 3,715,843 A | 2/1973 | Ballinger | 52/3 |
| 3,783,766 A | 1/1974 | Boucher | 98/33 |
| 3,949,527 A | 4/1976 | Double et al. | 52/4 |
| 4,035,051 A * | 7/1977 | Guy | 439/464 |
| 4,413,029 A | 11/1983 | Handwerker | 428/61 |
| 5,174,073 A | 12/1992 | Sabo | 52/3 |
| 5,352,855 A * | 10/1994 | Potter | 174/135 |
| 5,522,184 A | 6/1996 | Oviedo-Reyes | 52/23 |
| 5,579,794 A | 12/1996 | Sporta | 135/88.01 |
| 5,657,805 A | 8/1997 | Magro | 160/133 |
| 5,668,349 A | 9/1997 | Durham | 174/17 |
| 5,756,972 A * | 5/1998 | Vranicar et al. | 219/541 |
| 5,791,090 A | 8/1998 | Gitlin et al. | 52/4 |
| 5,852,899 A | 12/1998 | Finley | 52/2.24 |
| 5,912,433 A * | 6/1999 | Pulido et al. | 174/77 R |
| 5,918,430 A | 7/1999 | Rowland | 52/202 |
| 6,088,975 A | 7/2000 | Wiegel | 52/169.1 |
| 6,103,974 A * | 8/2000 | Erdfarb | 174/66 |
| 6,166,329 A * | 12/2000 | Oliver et al. | 174/58 |
| 6,176,050 B1 | 1/2001 | Gower | 52/222 |
| 6,224,139 B1 | 5/2001 | Weyand | 296/100.16 |
| 6,308,466 B1 | 10/2001 | Moriarty | 52/79.5 |
| 6,316,722 B1 | 11/2001 | Low et al. | 174/38 |
| 6,325,085 B1 | 12/2001 | Gower | 135/90 |
| 6,401,403 B1 | 6/2002 | Oviedo-Reyes | 52/79.1 |
| 6,415,557 B1 | 7/2002 | McCalley | 52/79.1 |
| 6,579,168 B1 | 6/2003 | Webster et al. | 454/184 |
| 6,598,668 B1 | 7/2003 | Cosley et al. | 165/104.32 |
| 6,865,852 B2 | 3/2005 | Gower | 52/222 |
| 2004/0143297 A1 * | 7/2004 | Ramsey | 607/5 |

* cited by examiner

*Primary Examiner*—Jinhee Lee
(74) *Attorney, Agent, or Firm*—G. Andrew Barger

(57) ABSTRACT

A cover and system are provided for protecting an electrical enclosure during intense storms. The cover includes a top wall and a sidewall parametrically bounding the top wall and that is attached thereto. The cover further includes at least one vent disposed in the sidewall for allowing heat to escape from the enclosure. Loops are attached to the sidewall for receiving an adjustable length cable tie. An adhesive is provided for releasably coupling the cover to the enclosure thereby securing the cover to the enclosure along with the tightened cable tie. The cover, vent, adjustable length cable tie, and adhesive form the system for protecting the electrical enclosure.

13 Claims, 5 Drawing Sheets

PROTECTIVE COVER AND SYSTEM FOR ELECTRICAL ENCLOSURES

FIELD OF THE INVENTION

The present invention relates generally to protective covers and systems for electrical enclosures. More particularly, the present invention relates to a cover and system for protecting electrical enclosures such as telecommunication outside plant enclosures, air conditioning condensers, cross connects, electrical junction boxes, etc., during intense storms like hurricanes and tornados.

BACKGROUND

Protection of electrical enclosures such as telecommunication outside plant enclosures, air conditioning condensers, electrical junction boxes for residential, commercial and industrial applications, etc. is very important during intense storms such as hurricanes and tornados. Such storms generate driving rain, windborne sand, hail, flooding, salt water, and windborne debris that can damage the enclosures by shorting out electrical circuitry within the enclosures, clogging heat vents, and damaging access panels.

Protective covers and systems have not been available to prevent storm damage to electrical enclosures such that the most common method of trying to protect such enclosures is by wrapping the enclosures in wide bands of cellophane or shrink-wrap.

Accordingly, it is desirable to have a cover and system for protecting electrical enclosures during intense storms that is durable, water resistant, reusable, provides venting for the enclosure's heat vents, and that provides a way of securing the cover to the enclosure such that it remains in place.

SUMMARY OF THE INVENTION

The present invention eliminates the above difficulties and disadvantages by providing a cover and system for protecting an electrical enclosure during intense storms. The cover includes a top wall and a sidewall parametrically bounding the top wall and that is attached thereto. An adhesive is also provided for releasably coupling the cover to the enclosure. A vent may be disposed in the sidewall for releasing heat generated by the enclosure. A section of material is secured over the vent. The section of material includes a top, a bottom and two opposing sides. The top and the bottom are secured over the vent with the two opposing sides being unsecured such that heat is allowed to pass from the vent and beyond the section of material at the two opposing sides. A plurality of loops are attached to the sidewall for receiving a fastening member therein and for retaining the fastening member in place against the cover. The fastening member is preferably an adjustable length cable tie that fits multiple sizes and shapes of different enclosures. Eyelets are included at the corners of the cover, which also receive the cable tie therethrough. The cover, vent, adjustable length cable tie, and adhesive form the system for protecting the electrical enclosure. During installation, a length of the adhesive (if a sticky mastic material is being used for the material) is applied around the enclosure. Plugs of the adhesive are also inserted into apertures or cracks formed in the metal of the enclosure. The cover is inserted over the enclosure and pressed against the adhesive. The cable tie strap is then inserted through the loops and eyelets. A head is installed on the strap and the cable tie is tightened, thereby tightening the cover additionally to the adhesive and the cover of the enclosure. The cover is also reusable.

BRIEF DESCRIPTION OF THE DRAWINGS

FIG. 3, combined with FIG. 1, is a protection system for the electrical enclosure of the present invention.

DETAILED DESCRIPTION OF THE PREFERRED EMBODIMENT(S)

Figure 1:
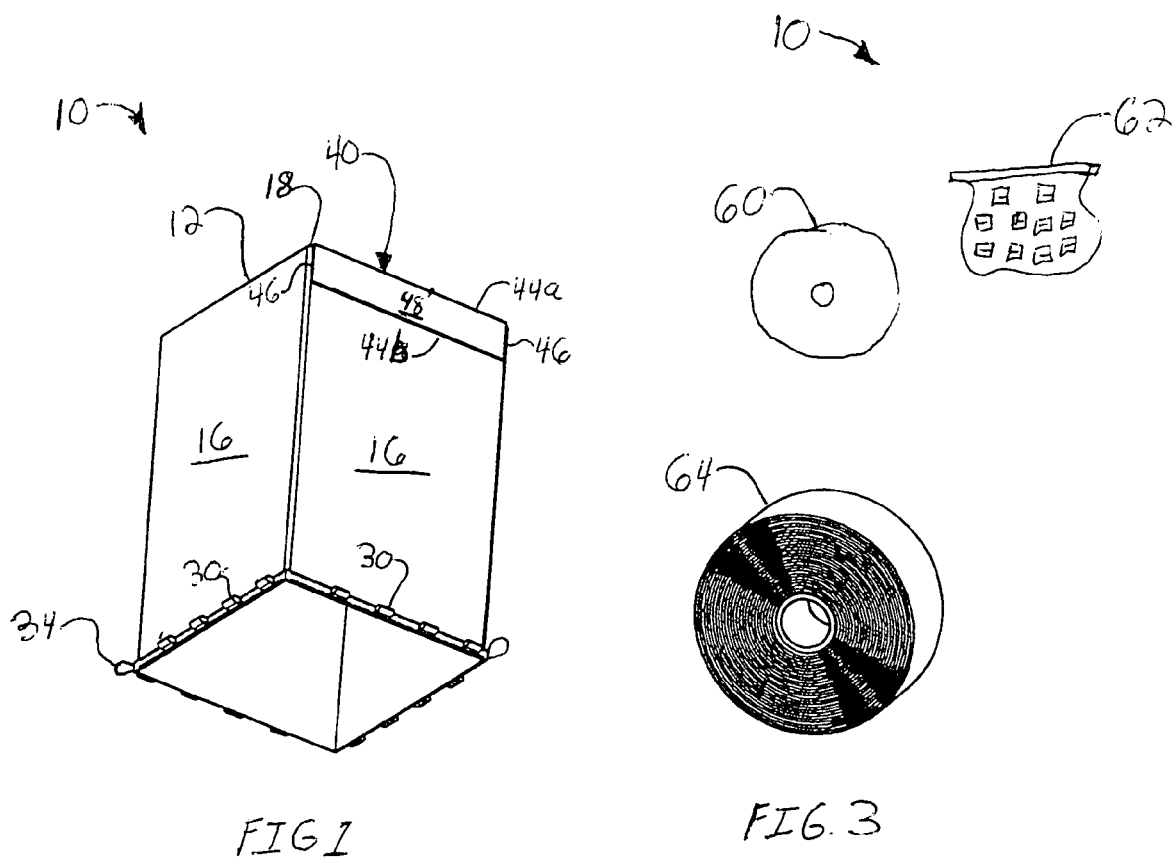
FIG. 1 is a perspective view of the cover of the present invention.
Figure 2:
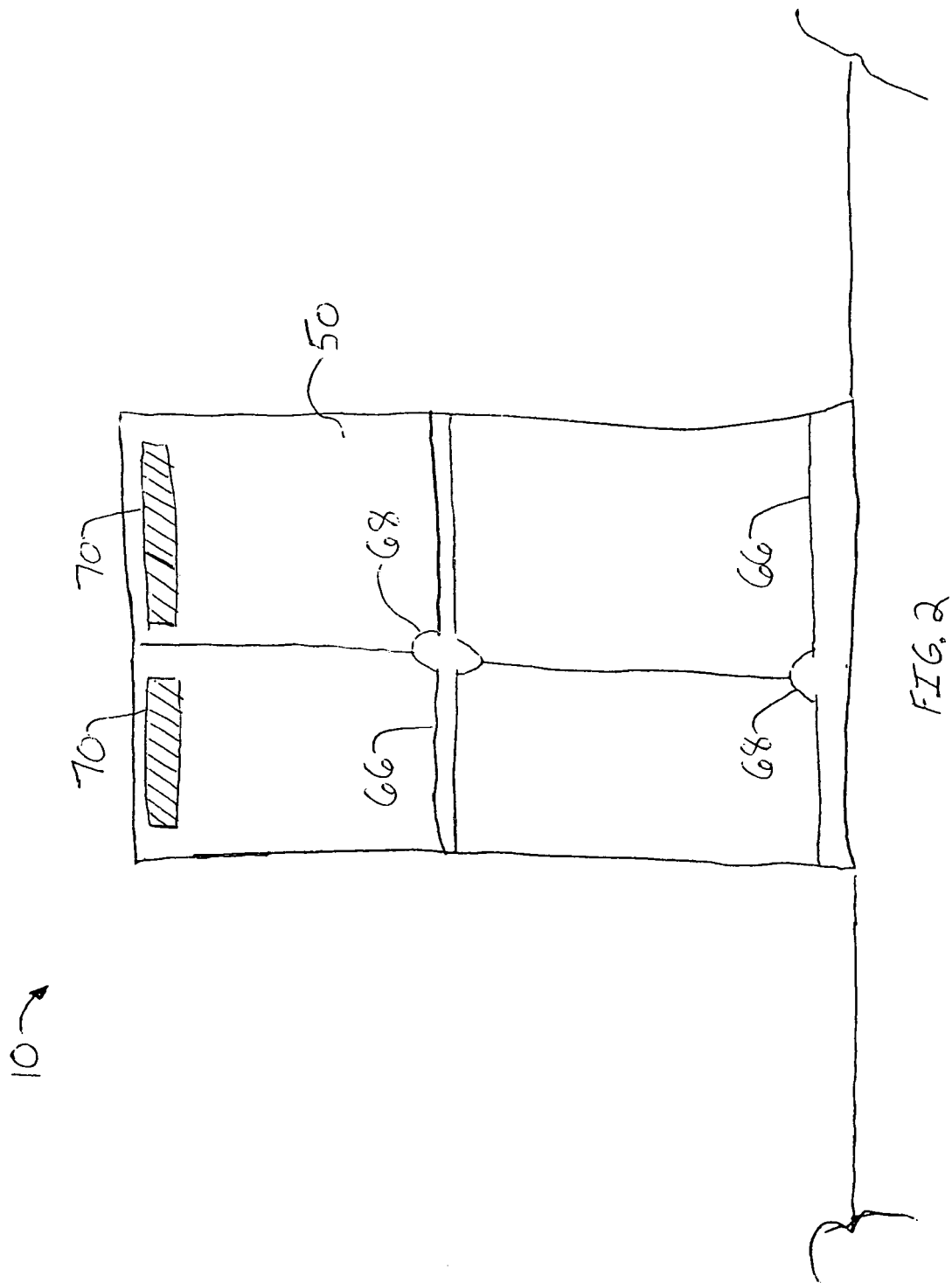
FIG. 2 is a side elevational view of the electrical enclosure.
Figure 4:
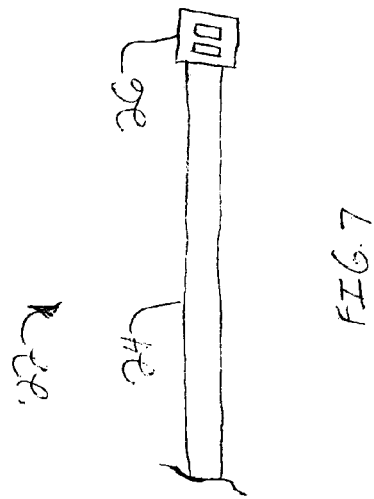
FIG. 4 is a side elevational view of the cover of the present invention.
Figure 8:
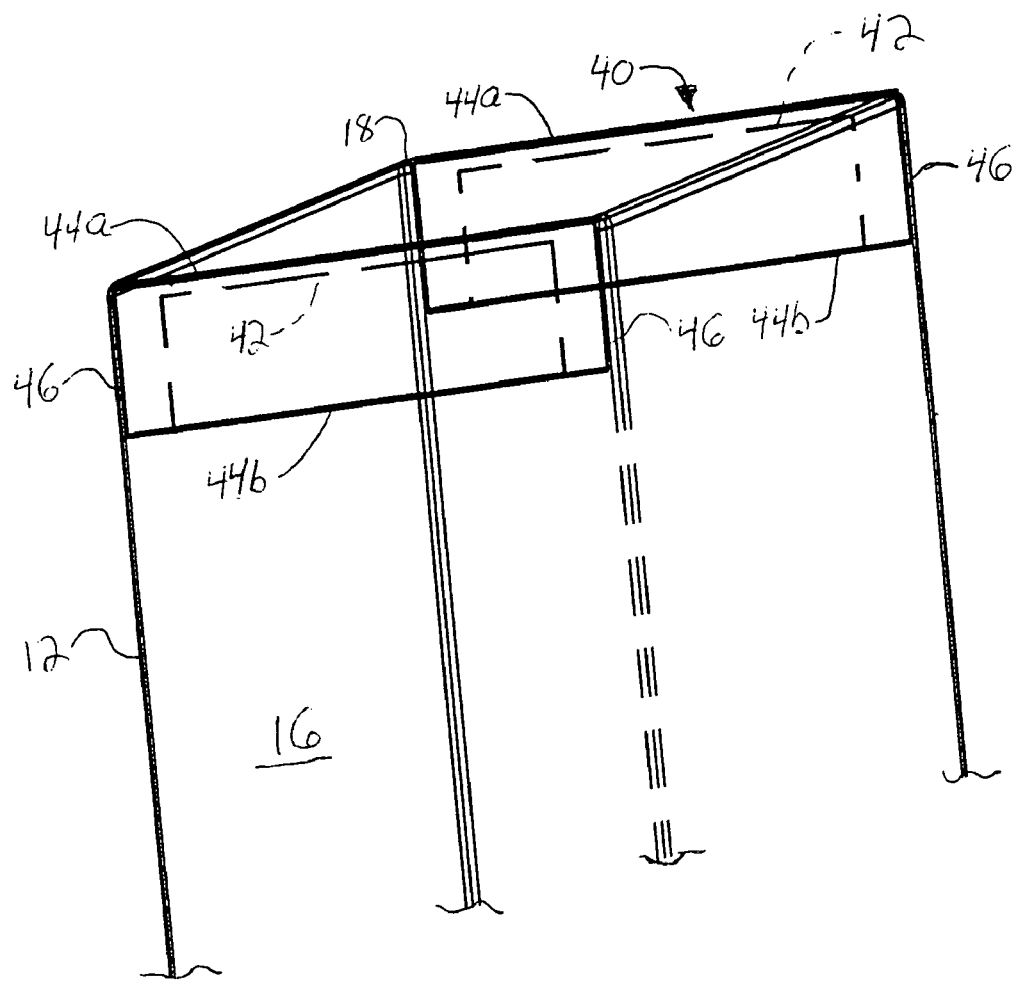
FIG. 8 is a partial perspective view of the cover for the present invention.

The above and other features, aspects, and advantages of the present invention will now be discussed in the following detailed description and appended claims, which are to be considered in conjunction with the accompanying drawings in which identical reference characters designate like elements throughout the views. Shown in FIG. 1 is a cover 12 that forms part of a system 10 for protecting an electrical enclosure 50, as shown in FIG. 2, during intense storms. The cover 12 is preferably constructed of soft, water resistant polyethylene material. Nylon or polyester material can also be used. Alternatively, vinyl is used as the interior layer of cover 12 and nylon or polyester used as the outer layer. The cover 12 is reversible and also puncture resistant to prevent hail and airborne debris from entering the cover 12. The cover 12 includes a top wall 14 and a sidewall 16, as shown in FIGS. 1, 4, and 8, parametrically bounding the top wall 14 and attached thereto by sown seams such as seam 18 that adjoins the sections of sidewall 16. Other means can also be used to join the top wall 14 and sidewall 16 as well as the sidewalls 16 together, such as hook and loop fasteners like Velcro or high-strength glue. Cover 12 can be constructed into any shape that is needed to fit the size and shape of the electrical enclosure 50. Since most electrical enclosures are rectangular, that is the shape shown here for demonstrative purposed. Cover 12 could also be square, triangular or cylindrical to fit the size and shape of respective electrical enclosures. For instance, many air conditioning condenser units are cylindrical in shape.

As is best shown in FIG. 8, a vent 40 is disposed in two of the sidewalls 16 for releasing heat generated by the enclosure 50. As shown in FIG. 2, the vents 70 of the enclosure 50 are mounted near the top of the enclosure 50. Therefore, opposing vents 40 are cut into cover 12 near the top wall 14, but could be placed anywhere in the cover 12 that is adjacent the corresponding vents 70 of the enclosure 50. Vents 40 are also displayed as being rectangular apertures 42, but again could be cut into any shape that corresponds to the shape of vents 70 in the enclosure 50. To protect vent 40 from getting rain, hail and debris therein, a section of material 48 is provided to cover vent 40. The section of material 48 includes a top 44a that is seamed at the top wall 14, and a bottom 44b that is seamed to the sidewall 16. In addition, the section of material 48 further has two opposing sides 46 which are left open. With the top 44a and the bottom 44b being secured over the vent 40 and with the two opposing sides 46 of the section of material 48 being unsecured, heat is allowed to pass out of the enclosure vents 70, through cover vent 40 and beyond the section of material 48 at the two opposing sides 46. Further, instead of using the section of material 48 a very fine mesh of material could be used to act as vent 40 instead of having a covered aperture 42 or, alternatively, the fine mesh of material could be used as the vent 40 to provide an extra filter against sand and small particulates while the section of material 48 is used as an extra layer of protection. Also, no vent 40 may be required for certain enclosures.

Figure 9:
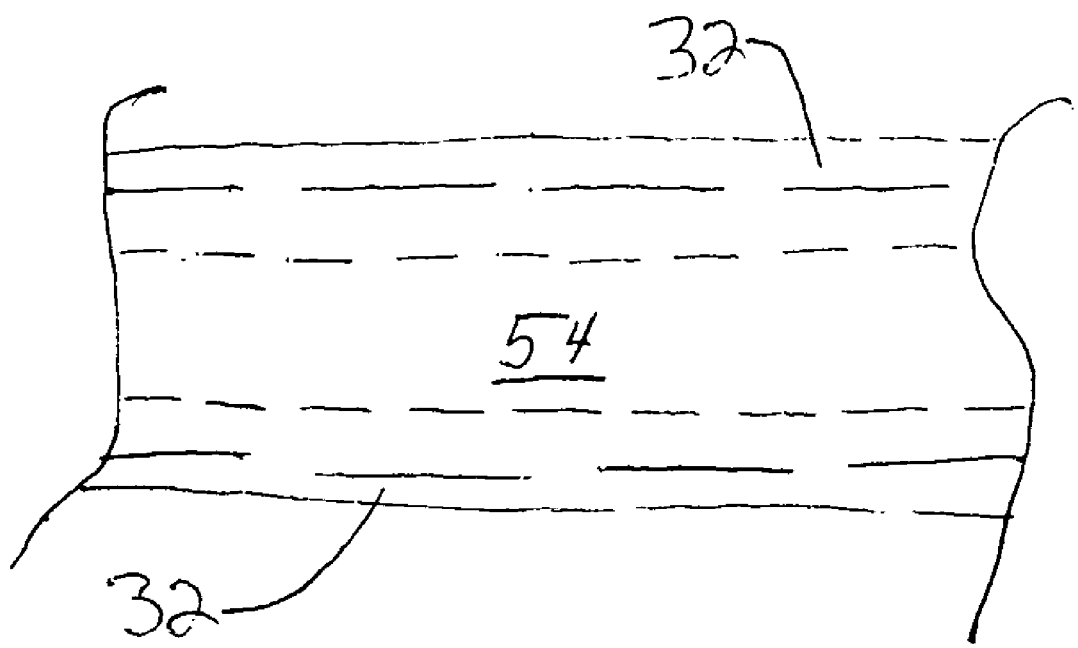
FIG. 9 is an alternate embodiment showing a length of magnetic material used as adhesive for the present invention.

As shown in FIG. 2 the present system 10, apart from cover 12, includes an adhesive 64/66 for releasably coupling the cover 12 to the enclosure 50. The adhesive 66 is preferably comprised of a double-sided, sticky mastic material such as that sold by Thomas & Betts Corporation of Memphis, Tenn, under the trademark TBT-28. The adhesive 66 could also be double-sided tape. One side of the adhesive 66 adheres to the enclosure 50 and the other side adheres to the cover 12, which will be discussed in more detail below. Alternatively, adhesive 66 is comprised of magnetic material 54 as shown in FIG. 9. The magnetic material 54, which is preferably in the shape of a strip, is secured in the sidewall 16 of cover 12 and disposed between double seams 32 such that at least part of the sidewall 16 is pressed between the magnetic material 54 and the metallic enclosure 50 to adhere the cover 12 to the enclosure 50.

Figure 5:
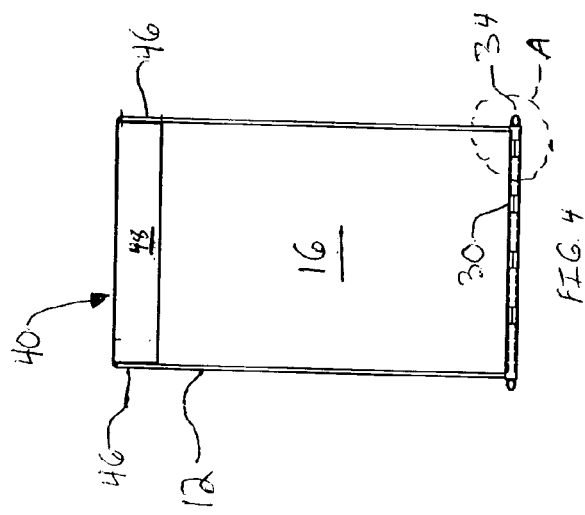
FIG. 5 is a plan view of the cover of the present invention.
Figure 6:
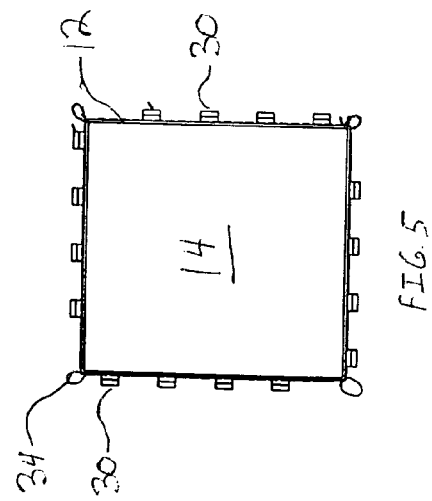
FIG. 6 is an expanded view of section A shown in FIG. 4 of the present invention.

A plurality of loops 30, as shown in FIGS. 1, 5 and 6 are attached to the sidewall 16. While four loops 30 are shown at the bottom of each sidewall 16, any number of loops could be provided as well as a continual seam with periodic openings. A continuous seam without openings could also be employed, but is not deemed as desirable as the multiple loop system shown because it would limit installer access to the cable tie inside the loops. In addition to loops 30, eyelets 34 are attached at each lower corner of the cover 12, as shown in FIGS. 1, 4, 5 and 6. Both loops 30 and eyelets 34 are attached to the lower end of cover 12 by double seams 32, as shown in FIG. 6, for increased strength. It is understood that loops 30 and eyelets 34 can be placed in any area of the cover 12 as deemed necessary and it is contemplated that multiple rows of loops 30 and eyelets 34 will be used such as one row at the top of enclosure 50, one row at the middle, and one row at the bottom.

The system 10 includes the cover 12, and as shown in FIG. 3, a spool of adhesive 64, a spool of cable tie strap 60 and a bag of cable tie heads 62. Installation of the system 10 is as follows. First, a length of adhesive 66 is stuck to the bottom of the enclosure 50 as shown in FIG. 2. For extra cover holding capability, lengths of adhesive 66 can be applied to any part of the enclosure 50, except across vents 70. The adhesive 66 applied at the bottom of the enclosure 50 resists the entrance of water as shown in FIG. 2. Further, plugs of adhesive 68 are stuffed into crevices along the enclosure 50 to further resist the entrance of water at these points. Next, the cover 12 is slid over the top of enclosure 50 and the areas adjacent the length of adhesive 66 and pressed against the adhesive 66. The adhesive 66 is double-sided such that when the sidewall 16 is pressed against the sticky mastic material the cover 12 adheres to the enclosure 50 at that location. If, however, the adhesive 66 is magnetic material, the first step of placing the adhesive along the enclosure 50 will not need to be taken or can be used in combination with the magnetic material.

Figure 7:
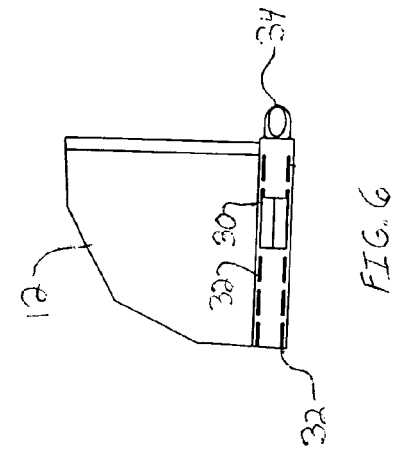
FIG. 7 is a side elevational view of an adjustable length cable tie of the present invention.

On the next step, a length of strap 24 of a cable tie 22, as shown in FIG. 7, is fished through loops 30 and eyelets 34 until it encompasses the entire cover 12. A cable tie head 26 is then added to the strap 24 and any excess strap 24 cut off. The loops 30 and eyelets 34 act as additional support retaining the fastening member in place against the cover 12 and preventing the cover 12 from being carried out from under the cable tie 22 in high winds. Additionally, the loops 30 and eyelets 34 aid a lone installer by keeping the cable tie strap 24 in place while it is being encircled about the cover 12. If multiple cable ties are desired, loops 30 and eyelets 34 can be attached at multiple levels of cover 12. Moreover, cover 12 can also be attached to bolts existing on the platform on which the enclosure 50 rests or to hooks connected to an elevated metal grate on which the enclosure 50 rests.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A cover for protecting an electrical enclosure having an upper side, a plurality of side walls, and a bottom side, the cover comprising:
   a top wall;
   a sidewall parametrically bounding the top wall and attached thereto;
   an adhesive for releasably coupling the sidewall to the enclosure;
   wherein the cover protects the electrical enclosure on the upper side and the plurality of side walls only;
   further comprising at least one vent disposed in the sidewall for releasing heat generated by the enclosure; and
   further comprising a section of material including a top, a bottom and two opposing sides, the top and the bottom being secured over the at least one vent and to the sidewall with the two opposing sides being unsecured such that heat is allowed to pass from the vent and beyond the section of material at the two opposing sides.

2. The cover of claim 1 wherein the adhesive is comprised of magnetic material secured in the sidewall of the cover such that at least part of the sidewall is pressed between the magnetic material and the enclosure to adhere the cover to the enclosure.

3. The cover of claim 1 wherein the adhesive is comprised of a sticky mastic material that is adhered to the enclosure such that when the sidewall is pressed against the sticky mastic material the cover adheres to the enclosure.

4. The cover of claim 1 further comprising a plurality of loops attached to the sidewall for receiving a fastening member therein and for retaining the fastening member in place against the cover.

5. The cover of claim 4 wherein the fastening member is an adjustable length cable tie.

6. A cover for protecting an electrical enclosure and for being at least partially secured to the electrical enclosure by a fastening member, the cover comprising:

a top wall;

a sidewall parametrically bounding the top wall and attached thereto;

at least one vent disposed in the sidewall;

a plurality of loops attached to the sidewall for receiving the fastening member therein and for retaining the fastening member in place against the cover;

further comprising an adhesive for releasably coupling the cover to the enclosure;

further comprising a section of material secured to the sidewall for covering the at least one vent, at least partially, to prevent rain and debris from entering the vent; and wherein the section of material includes a top, a bottom and two opposing sides, the top and the bottom being secured over the at least one vent and to the sidewall with the two opposing sides being unsecured such that heat is allowed to pass from the vent and beyond the section of material at the two opposing sides.

7. The cover of claim 6 wherein the sidewall is constructed of vinyl material.

8. The cover of claim 6 wherein the adhesive is comprised of magnetic material secured in the sidewall of the cover such that at least part of the sidewall is pressed between the magnetic material and the enclosure to adhere the cover to the enclosure.

9. The cover of claim 6 wherein the adhesive is comprised of a sticky mastic material that is adhered to the enclosure such that when the sidewall is pressed against the sticky mastic material the cover adheres to the enclosure.

10. A system for protecting an electrical enclosure having an upper side, a plurality of side walls, and a bottom side, the system comprising:

a cover, the cover comprising:

a top wall;

a sidewall parametrically bounding the top wall and attached thereto;

at least one vent disposed in the sidewall; and a plurality of loops attached to the sidewall;

at least one adjustable length cable tie for being received within the plurality of loops for retaining the cover to the enclosure;

an adhesive for releasably coupling the sidewall to the enclosure thereby securing the cover to the enclosure;

wherein the cover protects the electrical enclosure on the upper side and the plurality of side walls only; and wherein the at least one vent is covered, at least partially, to prevent rain and debris from entering the vent; and further comprising a section of material including a ton, a bottom and two opposing sides, the top and the bottom being secured over the at least one vent and to the sidewall with the two opposing sides being unsecured such that heat is allowed to pass from the vent and beyond the section of material at the two opposing sides.

11. The system for protecting an electrical enclosure of claim 1 further including the loops comprising at least one eyelet attached to the sidewall for receiving the at least one adjustable length of cable tie therethrough.

12. The system for protecting an electrical enclosure of claim 10 further comprising an adhesive comprised of magnetic material secured in the sidewall of the cover such that at least part of the sidewall is pressed between the magnetic material and the enclosure to adhere the cover to the enclosure.

13. The system for protecting an electrical enclosure of claim 10 further comprising an adhesive comprised of a sticky mastic material that is adhered to the enclosure such that when the sidewall is pressed against the sticky mastic material the cover adheres to the enclosure.

\* \* \* \* \*